United States Patent

Okamura

[11] Patent Number: 6,064,562
[45] Date of Patent: May 16, 2000

[54] ELECTRIC DOUBLE LAYER CAPACITOR

[75] Inventor: Michio Okamura, Kanagawa, Japan

[73] Assignee: JEOL Ltd., Tokyo, Japan

[21] Appl. No.: 09/135,906

[22] Filed: Aug. 18, 1998

[30] Foreign Application Priority Data

Aug. 21, 1997 [JP] Japan ................................. 9-224890

[51] Int. Cl.⁷ .......................... H01G 9/048; H01G 9/04
[52] U.S. Cl. ........................ 361/502; 361/532; 361/516
[58] Field of Search ................................. 361/503, 528, 361/532, 535, 502, 504, 508, 512, 526, 525, 521, 534, 305

[56] References Cited

U.S. PATENT DOCUMENTS

| | | | |
|---|---|---|---|
| 5,777,428 | 7/1999 | Farahmandi et al. | 313/352 |
| 5,859,761 | 1/1999 | Aoki et al. | 361/502 |
| 5,891,822 | 4/1999 | Oyama et al. | 502/427 |
| 5,926,361 | 7/1999 | Alford | 361/502 |

FOREIGN PATENT DOCUMENTS

| | | | |
|---|---|---|---|
| 2847 | 3/1982 | Japan . | |
| 61-203614 | 9/1986 | Japan . | |
| 407220985A | 8/1995 | Japan | 361/502 |
| 11067608A | 3/1999 | Japan | 361/502 |

*Primary Examiner*—Kristine Kincaid
*Assistant Examiner*—Mohamed ELGazzar
*Attorney, Agent, or Firm*—Webb Ziesenheim Logsdon Orkin & Hanson, P.C.

[57] ABSTRACT

An electric double layer capacitor having a large electrostatic capacity and a small internal resistance. This capacitor has positive and negative polarizing electrodes made of two kinds of carbonous material (such as activated carbon), respectively. These two kinds of activated carbons have different distributions of pore diameters.

3 Claims, No Drawings

ELECTRIC DOUBLE LAYER CAPACITOR

FIELD OF THE INVENTION

The present invention relates to an electric double layer capacitor and, more particularly, to an electric double layer capacitor having a large electrostatic capacity.

BACKGROUND OF THE INVENTION

In an electric double layer capacitor, a polarizing electrode including activated carbon is fabricated by kneading the activated carbon together with an electrically conducting material and a bonding material. Another known electric double layer capacitor is fabricated by mixing activated carbon and uncarbonized phenol resin, sintering the mixture to form solid electrodes acting as positive and negative electrodes, respectively, placing these two electrodes on opposite sides of a separator, bringing electric charge collectors into contact with the electrodes and impregnating the electrodes with an aqueous or nonaqueous electrolyte. It is common practice to fabricate the positive and negative electrodes from the same amount of the same material.

Japanese Unexamined Patent Publication No. 203614/1986 describes an electric double layer capacitor having positive and negative electrodes fabricated from the same amount of the same material. These two electrodes are equal in electrostatic capacity. This Japanese Publication states that when the capacitor is charged and discharged with a voltage corresponding to the withstand voltage, deterioration of the internal resistance and the electrostatic capacity is observed. Deterioration of the characteristics due to high-voltage application is prevented by matching the electrostatic capacities of the positive and negative polarizing electrodes to the ratio of the inverses of the reaction potentials of the positive and negative electrodes, respectively, when the null potential of the potential-current characteristic curve is used as a reference.

Japanese Patent Publication No. 847/1990 describes a method of moderating similar problems. This is achieved by making different the amounts of positive and negative polarizing electrodes. However, careful observation of the charging and discharging operation of the capacitor having this structure reveals the following problem. When the power supply is turned on, i.e., in the initial stage of charging, the voltages that the positive and negative electrodes must bear, respectively, are distributed according to the inverse proportion to electrostatic capacity. As the charging and discharging are repeated, the voltages that the electrodes must bear are distributed gradually at the ratio of leakage resistances. Consequently, the original purpose cannot be achieved.

SUMMARY OF THE INVENTION

It is an object of the present invention to provide an electric double layer capacitor to which a large energy density is imparted by using polarizing electrodes adapted for the positive and negative electrodes, respectively.

This object is achieved by an electric double layer capacitor having positive and negative polarizing electrodes consisting of carbonous electrodes having different distributions of pore diameters.

The present invention also provides an electric double layer capacitor comprising a positive polarizing electrode, a negative polarizing electrode and an electrolyte present between these two electrodes. Carbonous electrodes having average pore diameters corresponding to the ion diameters of cations and anions collected to negative and positive electrodes, respectively, are used as negative and positive polarizing electrodes, respectively.

In an electric double layer capacitor in accordance with the invention, carbonous electrodes are used as positive and negative electrodes, respectively. The carbonous electrodes have pore diameter distributions corresponding to the effective sizes of ions of cations and anions of an electrolyte, including the salvation of the ions and other phenomena. The positive and negative electrodes are fabricated as their respective optimum polarizing electrodes by using the carbonous electrodes of pore diameter distributions adapted for the diameters of their respective ions of the electrolyte.

In the present invention, the pore diameters of the polarizing electrodes used as the positive and negative electrodes, respectively, are correlated with the effective ion diameters produced by the effects of ionization of the electrolyte and their solvations. For example, where the diameter of the cations is larger than that of the anions, the pore diameter of the negative polarizing electrode is selected to be larger than that of the positive polarizing electrode according to the diameters of the cations and anions.

For instance, where tetraethylammonium tetrafluoroborate is used as an electrolyte, it is estimated that the ion diameter of cations consisting of tetraethylammonium is 0.34 nm (nanometers) and the ion diameter of anions consisting of tetrafluoroborate is 0.22 nm. Accordingly, if the effective ion diameters including the salvation are in proportion to the above-described estimated values, it is reasonable to fabricate the negative electrode from activated carbon having larger pore diameters, because larger ions are collected to the negative electrode compared with the positive electrode.

In an electric double layer capacitor, if a single layer of ions is formed on the surfaces of pores in the carbonous electrodes of activated carbon, the number of ions that can be contained in the layer is in inverse proportion to the squares of the ion radius. However, if the pore diameter is not sufficiently larger than the ion diameter, and if the pore walls are not flat, the number of microscopic spherical bodies that can be packed in a unit volume is in proportion to the cube of the radius. If we make a moderate assumption that the number is in proportion to the square of the ion diameter taking account of various effects, such as the actual shapes of pores and the solvations of the ions, the number of cations that can be packed in a unit volume on the positive side is greater than the number of anions packed in a unit volume on the negative side by a factor of $0.34^2/0.22^2 = 2.4$.

Where tetraethylammonium tetrafluoroborate is used as an electrolyte, two kinds of activated carbon are prepared to form carbonous electrodes as positive and negative electrodes, respectively. These two kinds of activated carbon have narrow distributions of pore diameters, and have the most frequently occurring values a and b, respectively. The ratio of these values a and b is a:b=0.34:0.22. The negative electrode is fabricated from the activated carbon of greater pore diameters. The positive electrode is fabricated from the activated carbon of smaller pore diameters. A capacitor is fabricated using a combination of these electrodes. In consequence, an electric double layer capacitor whose electrostatic capacity and internal resistance both have excellent characteristics can be obtained.

Other objects and features of the invention will appear in the course of the description thereof, which follows.

DESCRIPTION OF THE PREFERRED EMBODIMENT

EXAMPLE AND COMPARATIVE EXAMPLE

First, 82 mg of activated carbon having an average pore diameter of 1.6 nm (measured by the nitrogen adsorption method), 9 mg of carbon black and 9 mg of powdered polytetrafluoroethylene were mixed and compacted into a disk having a diameter of 20 mm. The disk was placed in a vacuum desiccator. The inside of this desiccator was evacuated to $10^{-2}$ torr. The disk was dried at 110° C. for four hours to fabricate a polarizing electrode A.

A polarizing electrode B was fabricated similarly to the polarizing electrode A except that activated carbon having an average pore diameter of 1.1 nm was used.

The polarizing electrodes A and B were compressed in a glove box and placed on top of each other via a glass fiber separator 100 µm thick. The outer surface of each polarizing electrode was held between electric charge-collecting electrodes of aluminum, thus forming capacitor elements.

The capacitor elements were put into a hermetic container of aluminum. An electrolyte was prepared by dissolving 1 mol of tetraethylammonium tetrafluoroborate in propylene carbonate. The capacitor elements were immersed with a sufficient amount of the electrolyte. The opening of the container was sealed with an O-ring. In this way, an electric double layer capacitor used for testing was fabricated.

A charging and discharging cycle test was conducted on this electric double layer capacitor under conditions of a full charge voltage of 2.3 V and a current of 5 mA. To avoid the effects of initial characteristics, the electrostatic capacity and the internal resistance were measured at the third cycle. The results are given in Table 1 below.

TABLE 1

|  | negative electrode | positive electrode | electrostatic capacity (F/cm$^3$) | internal resistance (Ω/m) |
| --- | --- | --- | --- | --- |
| capacitor 1 | A | B | 26.6 | 24 |
| capacitor 2 | A | A | 20.8 | 23 |
| capacitor 3 | B | B | 27.5 | 257 |
| capacitor 4 | B | A | 18.8 | 243 |

It can be seen from Table 1 that the capacitor 2 is slightly lower in internal resistance than the capacitor 1, but the capacitor 1 is greater than the capacitor 2 in electrostatic capacity by 30%. Since they differ only slightly in internal resistance, the capacitor 1 having the greater electrostatic capacity is much superior to the capacitor 2.

The capacitor 3, whose positive and negative electrodes are both made of the polarizing electrode B, is slightly higher in electrostatic capacity than the capacitor 1. However, the capacitor 3 is greater than the capacitor 1 in internal resistance by a factor of more than ten.

The capacitor 4 whose negative and positive electrodes are made of the polarizing electrodes B and A, respectively, has the lowest electrostatic capacity. In addition, its internal resistance is high. The capacitor 4 has the worst characteristics among these four capacitors.

As described thus far in the present invention, positive and negative polarizing electrodes are made of two kinds of activated carbon having different distributions of pore diameters. Hence, an electric double layer capacitor having both excellent electrostatic capacity characteristics and excellent internal resistance characteristic can be obtained.

Having thus described my invention with the detail and particularity required by the Patent Laws, what is desired protected by Letters Patent is set forth in the following claims.

What is claimed is:

1. An electric double layer capacitor comprising:

a positive polarizing electrode made of a first kind of carbonous material having a first distribution of pore diameters; and a negative polarizing electrode made of a second kind of carbonous material having a second distribution of pore diameters, said second distribution being different from said first distribution.

2. An electric double layer capacitor comprising:

a positive polarizing electrode made of a first kind of carbonous material, said positive electrode collecting anions, said first kind of carbonous material having an average pore diameter corresponding to ion diameter of said anions;

a negative polarizing electrode made of a second kind of carbonous material collecting cations, said second kind of carbonous material having an average pore diameter corresponding to ion diameter of said cations; and an electrolyte existing between said positive and negative electrodes.

3. The electric double layer capacitor of claim 2, wherein said carbonous material consists of activated carbon.

* * * * *

UNITED STATES PATENT AND TRADEMARK OFFICE
CERTIFICATE OF CORRECTION

PATENT NO. : 6,064,562
DATED : May 16, 2000
INVENTOR(S) : Michio OKAMURA

It is certified that error appears in the above-identified patent and that said Letters Patent is hereby corrected as shown below:

Column 3 Line 32 "($\Omega$/m)" should read --ohms--.

Signed and Sealed this

Third Day of April, 2001

Attest:

NICHOLAS P. GODICI

Attesting Officer     Acting Director of the United States Patent and Trademark Office